UNITED STATES PATENT OFFICE.

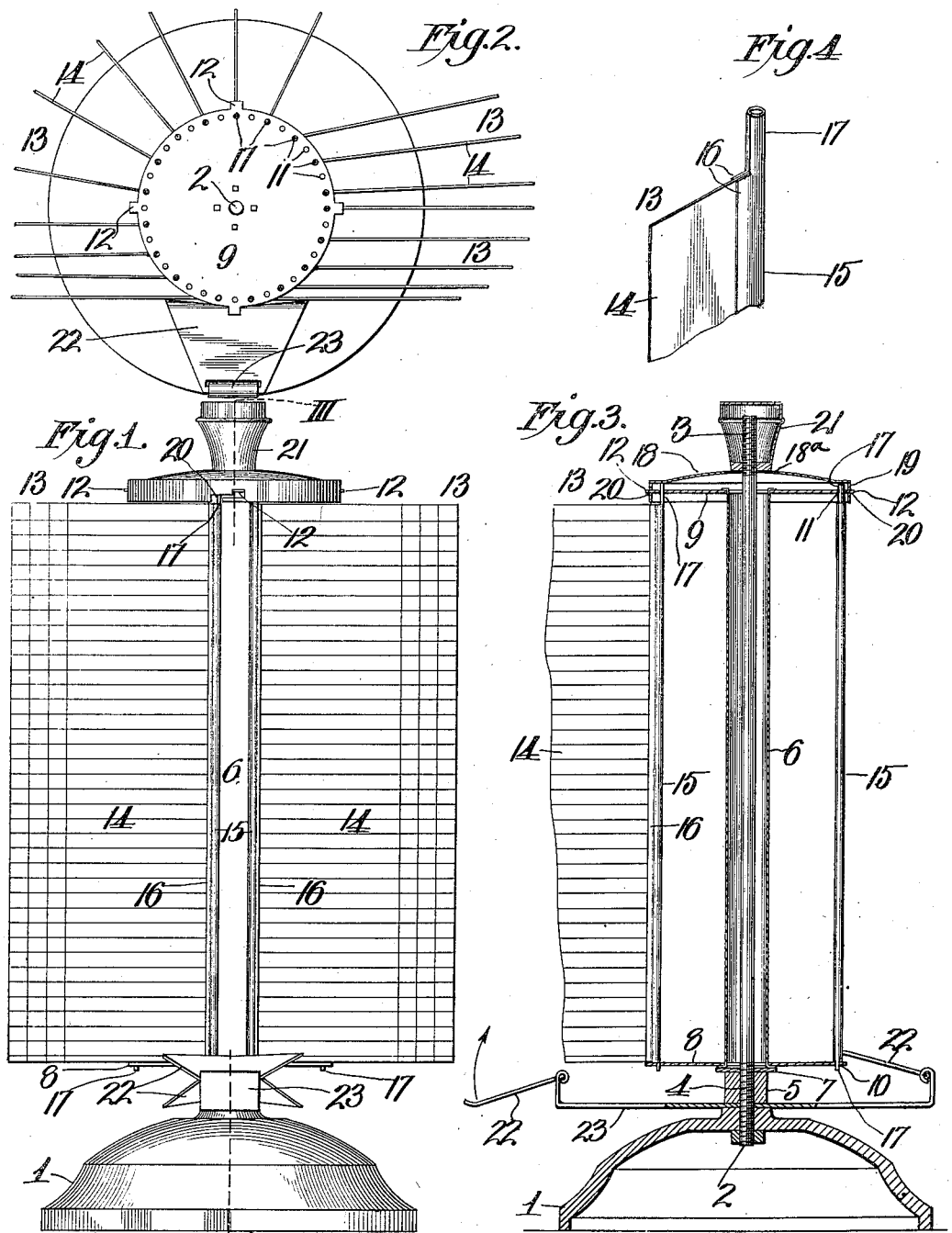

CHARLES C. DANIEL, OF KANSAS CITY, MISSOURI.

LOOSE-LEAF DIRECTORY.

1,001,124.  Specification of Letters Patent.  Patented Aug. 22, 1911.

Application filed April 21, 1910. Serial No. 556,893.

*To all whom it may concern:*

Be it known that I, CHARLES C. DANIEL, a citizen of the United States, residing at Kansas City, in the county of Jackson and State of Missouri, have invented certain new and useful Improvements in Loose-Leaf Directories, of which the following is a specification.

This invention relates to loose leaf directories of that class embodying a plurality of hinged leaves and adapted for use upon or adjacent to a desk to enable a person seated thereat to inspect any desired leaf easily and quickly, and my object is to produce a device of this character of ornamental and attractive appearance and of simple, durable and cheap construction.

With this object in view and others as hereinafter appear the invention consists in certain novel and peculiar features of construction and organization as hereinafter described and claimed; and in order that it may be fully understood reference is to be had to the accompanying drawings, in which—

Figure 1, is an elevation of a loose leaf directory embodying my invention. Fig. 2, is a top view of the same with the cap and knob or handle omitted. Fig. 3, is a vertical section on the line III—III of Fig. 1. Fig. 4, is an enlarged perspective view of a fragment of one of the leaves of the device.

In the said drawing which discloses the directory for use as a desk stand, 1 indicates a suitable base and secured centrally to the same and projecting vertically upward therefrom is a rod 2, provided with screw threads 3 at its upper end and also threaded at its lower end by preference as at 4, and mounted upon the lower end of the rod above the base is a collar 5 as a support for a frame adapted for rotation upon the rod, the frame being constructed as follows:—
6 is a tube fitting loosely upon the rod and provided with a closed lower end 7 resting upon the collar 5. 8 and 9 are horizontal disks secured respectively to the upper and lower ends of the tube and provided near their margins with circular series of holes 10 and 11, the upper disk being provided with a plurality of outwardly projecting tongues 12.

13 indicates the leaves of the device, said leaves consisting of cards 14 of suitable material and hinge clips 15 bent from a strip of tin or equivalent material by preference, to tubular form with jaws 16 to receive and hold firmly between them the inner edges of the cards, and said clips are also provided with extensions 17 for pivotal engagement with the holes 10 and 11 of the disks 8 and 9 of the rotary frame, it being understood that the extensions 17 of each leaf will occupy the holes of the disk which lie in the same radial plane with respect to the axis of the frame so that the leaf may be capable of free hinge movement, the lower ends of the tubular clips resting as shown in Fig. 3 upon disk 8, and the upper ends of the clips terminating below disk 9 a distance slightly in excess of the length of the lower extensions 17, so that when a leaf is grasped and lifted, its lower extension 17 may be disengaged from the disk 8 and thus enable the operator to swing the leaf outward slightly preliminary to drawing it downward to disengage the upper extension 17 from disk 9, it being obvious that this manipulation of the leaf is reversed to resecure it in the rotary frame.

18 is a cap fitting loosely around the rod 2 above the rotary frame and provided with a marginal flange 19 depending around disk 9, said flange being provided with bayonet slots 20 for the reception of tongues 12 of disk 9, so that the cap will have to be lifted and turned at the same time to disengage it from the tongues to permit a leaf to be placed in or removed from position.

Secured upon the upper end of the rod 3 is a knob or handle 21, which gives the top of the structure an ornamental appearance and constitutes a handle whereby the structure may be conveniently lifted, it being noticed that the cap is provided centrally with an opening 18$^a$ sufficiently large to easily receive the lower part of the knob so that the latter shall not interfere with the raising and lowering of the cap.

To conveniently inspect one of the leaves a person seated at the desk upon which the device stands, grasps the cap or a leaf and imparts turning movement to the frame until the adjustment sought is attained. the leaf believed to contain the information being then swung outwardly so that it may be more readily inspected.

At times it may be desired to maintain a leaf in what may be termed "open" position for some time and to guard against accidental closing movement of such leaf I provide one or more pivoted clamps 22. carried by a cross bar 23 bearing a fixed relation by preference to the base, the preferred construction being to mount the cross bar upon the rod 2 between the base and collar 5. By reference to Figs. 1 to 3 inclusive, it will be seen that when the leaves are swung apart for convenient inspection, the adjacent clamp 22 is swung in the direction indicated by the arrow, Fig. 3, until it bears against the exposed faces of the separated or opened leaves and thus guards against the accidental closing thereof.

In practice the leaves as will be readily understood will contain information of all kinds so as to be of use and value to persons engaged in different lines of work, and to make it more convenient as a ready reference device the cards may be differently colored, classified and indexed as well known in card index systems.

From the above description it will be apparent that I have produced a loose leaf directory possessing the features of advantage enumerated as desirable in the statement of the object of the invention and I wish it to be understood that I do not desire to be restricted to the exact details of construction shown and described as obvious modifications will suggest themselves to one skilled in the art.

Having thus described the invention what I claim as new and desire to secure by Letters Patent, is:—

A loose leaf directory, comprising a base, a vertical rod mounted on the base, a collar upon the rod above the base, a tube fitting loosely on the rod and resting on the collar, a horizontal disk secured on the lower end of the tube and provided with a circular series of perforations near its outer margin, a similar perforated disk secured on the upper end of the tube, leaves fitting at their inner edges between the disks and provided at such edges with depending and upwardly projecting pivot pins, the depending pins of the leaves engaging the perforations of the lower disk and the upwardly-projecting pins of the leaves engaging perforations of the upper disk, a knob secured on the upper end of said rod, and a centrally perforated cap resting normally upon the upwardly projecting pivot pins and provided with a depending flange encircling and bearing an interlocked relation to the upper disk and susceptible of being lifted without disturbing the knob until said flange is above the plane of the upper disk to permit the upwardly projecting pins to slide upwardly in the perforations of the upper disk until the depending pins are withdrawn from the perforations of the lower disk, preliminary to the removal of the leaves.

In testimony whereof I affix my signature, in the presence of two witnesses.

CHARLES C. DANIEL.

Witnesses:
  HELEN C. RODGERS,
  G. Y. THORPE.